United States Patent
Kerr, Jr.

(10) Patent No.: US 6,676,442 B2
(45) Date of Patent: Jan. 13, 2004

(54) QUICK CONNECTED DEVICE WITH EASY INSTALLATION FEATURES INCLUDING A PLUG AND SPRING

(75) Inventor: Jack Russell Kerr, Jr., College Station, TX (US)

(73) Assignee: Angelo Fan Brace Licensing, LLC, Philadelphia, PA (US)

( * ) Notice: Subject to any disclaimer, the term of this patent is extended or adjusted under 35 U.S.C. 154(b) by 0 days.

(21) Appl. No.: 10/176,163

(22) Filed: Jun. 20, 2002

(65) Prior Publication Data

US 2002/0197910 A1 Dec. 26, 2002

Related U.S. Application Data

(60) Provisional application No. 60/299,635, filed on Jun. 20, 2001.

(51) Int. Cl.[7] .................................................. H01R 13/60
(52) U.S. Cl. ........................ 439/537; 439/246; 362/147
(58) Field of Search ................................ 439/536, 537, 439/545, 546, 548, 552, 555, 556, 246, 247; 362/147

(56) References Cited

U.S. PATENT DOCUMENTS

| | | | | |
|---|---|---|---|---|
| 3,798,584 A | * | 3/1974 | Person | 439/102 |
| 4,645,286 A | * | 2/1987 | Isban et al. | 439/571 |
| 4,729,725 A | * | 3/1988 | Markwardt | 417/423.15 |
| 6,146,191 A | * | 11/2000 | Kerr et al. | 439/537 |
| 6,238,239 B1 | * | 5/2001 | Wu | 439/537 |
| 6,305,974 B1 | * | 10/2001 | Tseng | 439/537 |
| 6,322,232 B1 | | 11/2001 | Oliver | 362/147 |
| 6,390,777 B1 | * | 5/2002 | Kerr, Jr. | 416/204 R |

* cited by examiner

Primary Examiner—Truc Nguyen
(74) Attorney, Agent, or Firm—Drinker Biddle & Reath LLP (57) ABSTRACT

An apparatus for easily installing an overhead electrical device is disclosed. Installation is made easier by forming guide channels in the bell of an electrical fixture and aligning those channels with guides on a plate. When the guide and channels are properly aligned, an electrical connection is made between a plug and receptacle. The plug and receptacle are mounted in the bell and to the junction box. Once the electrical connection is made, the bell is rotated to secure the bell to the guides mounted on the plate.

20 Claims, 8 Drawing Sheets

QUICK CONNECTED DEVICE WITH EASY INSTALLATION FEATURES INCLUDING A PLUG AND SPRING

RELATED APPLICATIONS

This application claims priority to the Provisional Application entitled "Quick Connect Device With Easy Installation Features Including a Plug and Spring", U.S. Ser. No. 60/299,635, filed Jun. 20, 2001.

FIELD OF THE INVENTION

The present invention is directed to the general field of suspended electrical fixtures and, more particularly, to devices that make the tasks of mounting a suspended electrical fixture to an overhead support and connecting the fixture to an electrical supply easier.

BACKGROUND OF THE INVENTION

The installation of a suspended electrical fixture to an overhead support is a difficult task for a single installer. For example, to install a conventional ceiling fan, the fan is lifted to just below the electrical junction box and held there while the installer connects the fan wires to the electrical supply wires. After the electrical connection is finished, the fan is lifted further to place the fan bell (or "canopy") over the junction box and held in that position while the fan is attached to the box or a ceiling hanger in some manner, typically with screws or bolts. The combined operation takes several minutes and usually requires two persons, one to lift and hold and the other to make the wire and screw connections.

Installing a suspended electrical fixture can also pose a risk of electrical shock to the installer and/or short-circuiting the electrical supply circuit. Some installers, particularly do-it-yourself homeowners, are prone to either forget or neglect to shut off the supply of electricity to the circuit they are installing the fixture in. Most conventional fixtures have bare-ended wires meant to be spliced to supply wires located in an overhead junction box. An installer who fails to shut off the electricity and splices live wires risks receiving an electrical shock. Even if the fixture was supplied with a conventional electrical plug, an installer could get an electrical shock by touching one of the plug's prongs when the plug is partially inserted into a live receptacle. If the installer touched two of the partially inserted prongs simultaneously with a finger, tool or other conductive object, the supply circuit short-circuits.

SUMMARY OF THE INVENTION

The present invention is directed to a mounting device for hanging an electrical fixture from an overhead support and connecting the fixture to an electrical supply. The quick connect device includes a plug and receptacle, a plug plate, a spring, and a receptacle assembly. The plug plate is mounted to an electrical box and the bell is mounted to the receptacle assembly.

During installation of an electrical fixture using the quick connect device, the plug and receptacle automatically align and an electrical connection between a plug and receptacle is safely and easily made. The weight of the bell/electrical fixture is also easily transferred to a plug plate, without the need for additional mechanical operations to secure the electrical fixture to the electrical box.

The plug plate includes a plug, guides, and a plurality of elongated electrical conductors. The bell has channels that engage guides in the plug plate. The channels have two positions: one position aligns the plug and receptacle. The other position supports the weight of the electrical fixture. The plug is secured to either the plug plate or the receptacle assembly and the receptacle is secured to the other. The conductors of the plug are contained within a skirt; the skirt and conductors engage the outer periphery of the receptacle and its sockets respectively.

The receptacle assembly includes a receptacle, spring, and receptacle channel. The bell cover is attached to the receptacle assembly. The receptacle assembly has a receptacle mounted thereon. The receptacle has an outer periphery and a plurality of sockets for receiving plug conductors. The outer periphery of the receptacle is adapted to matingly engage the inner surface of the skirt of the plug.

The receptacle is slidably mounted in a receptacle channel within the receptacle plate. The receptacle is held in an alignment position by a spring. When the receptacle is in the alignment position, the plug and receptacle matingly engage as the bell is pushed toward the plug plate along the alignment channel in the bell. During installation, the plug and receptacle are engaged, and the bell is rotated to transfer the load to the plug plate. As the receptacle assembly is rotated with the bell, the plug and receptacle remain stationary. The receptacle assembly slides around the mated plug and receptacle along the receptacle channel until the plug plate and bell are fully engaged.

BRIEF DESCRIPTION OF THE DRAWINGS

For the purpose of illustrating the invention, there is shown in the drawings a presently preferred; it being understood, however, that this invention is not precise arrangements and instrumentalities shown.

DETAILED DESCRIPTION OF THE DRAWINGS

Figure 1:
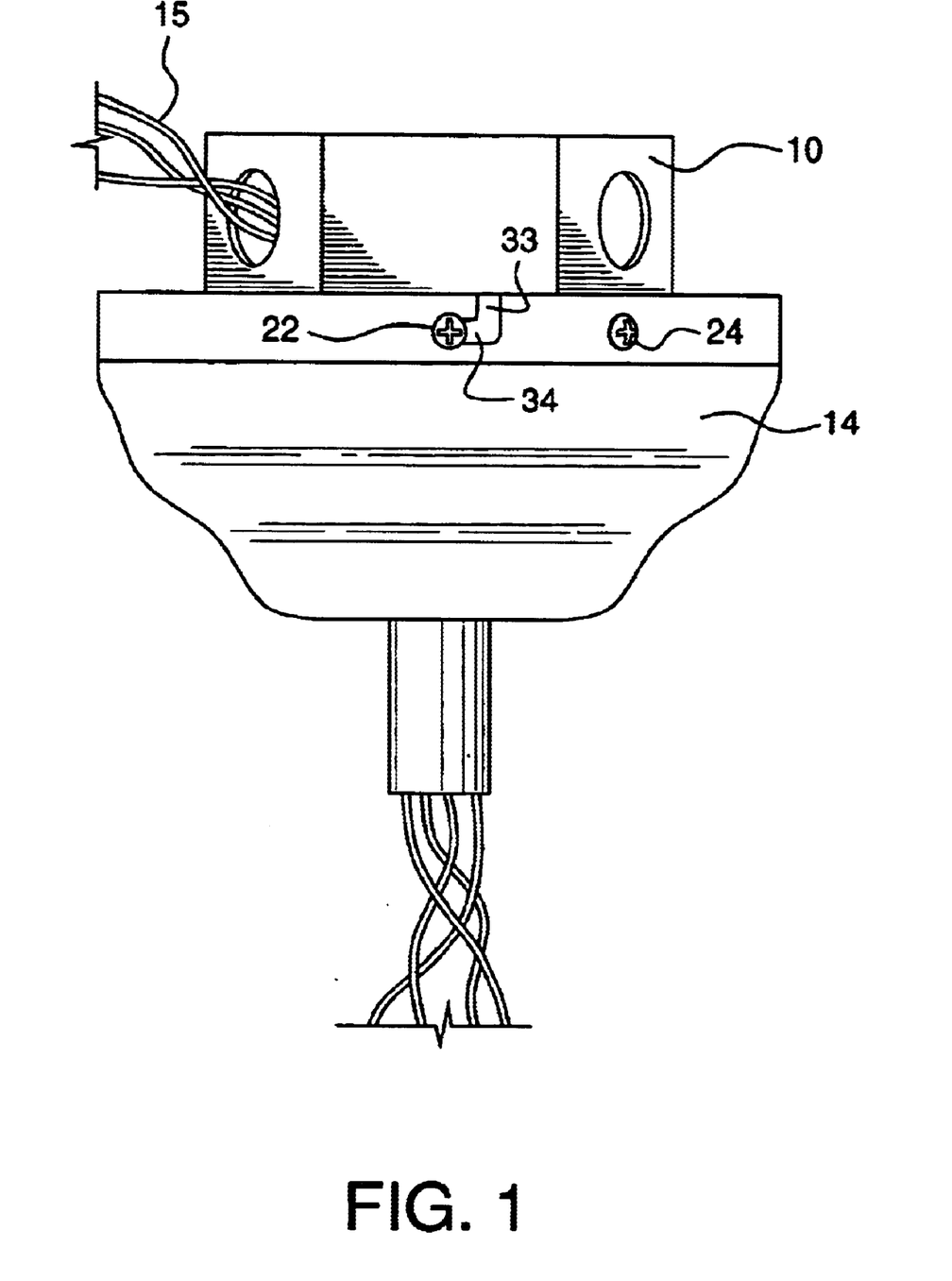
FIG. 1 is a side elevation of the quick connect device engaged to a bell and electrical box.
Figure 2:
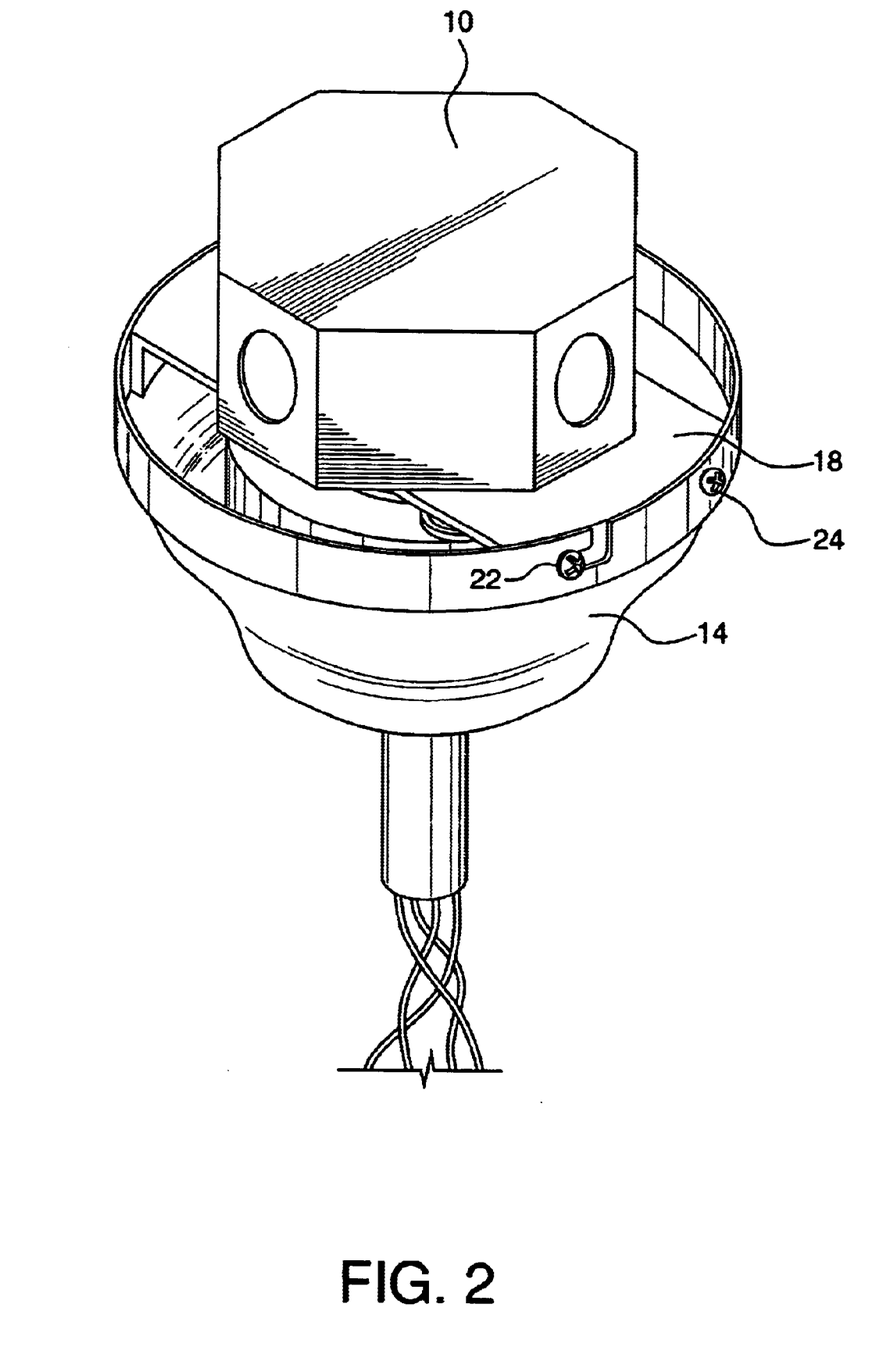
FIG. 2 is a perspective view of the quick connect device engaged to a bell and an electrical box.
Figure 3:
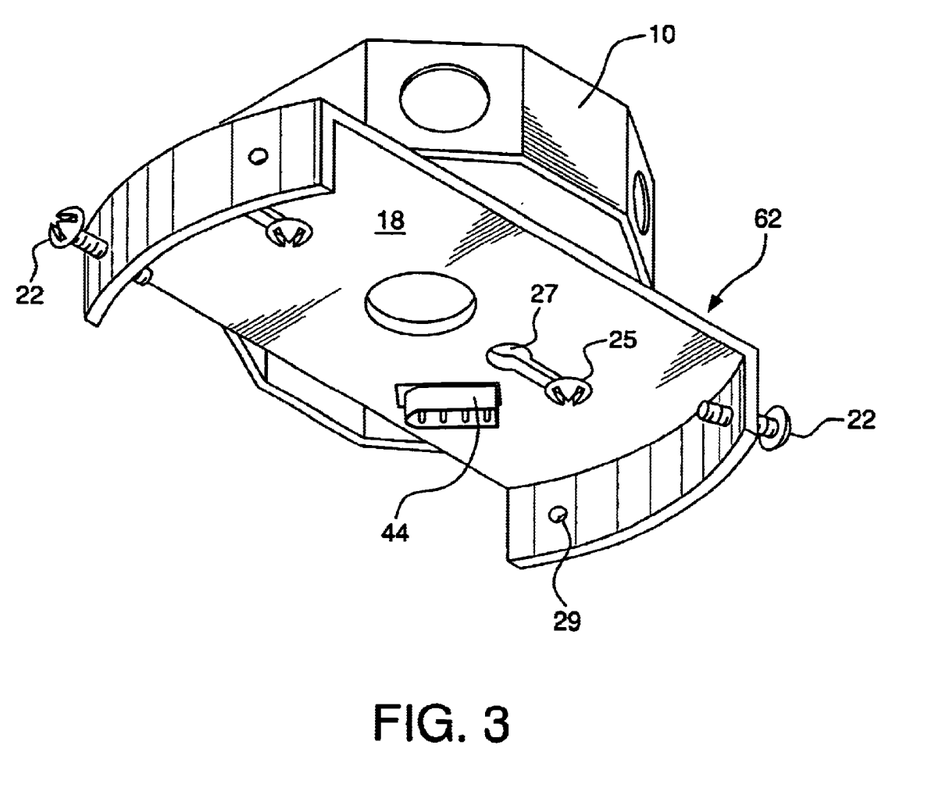
FIG. 3 is a perspective view from below of a plug plate mounted to an electrical box.
Figure 4:
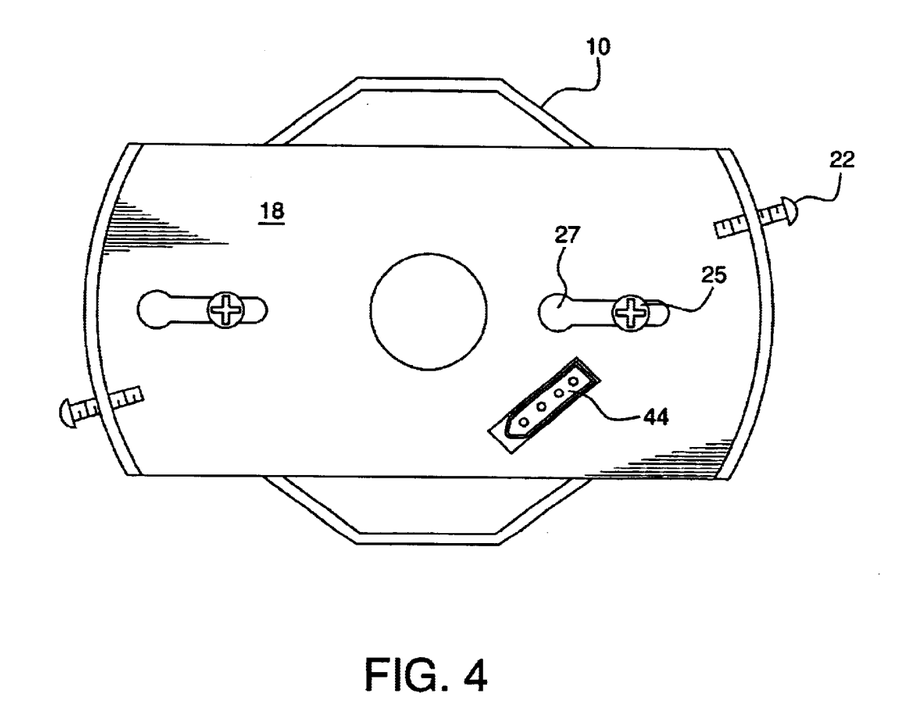
FIG. 4 is a bottom view of the plug plate mounted on the electrical box.
Figure 5:
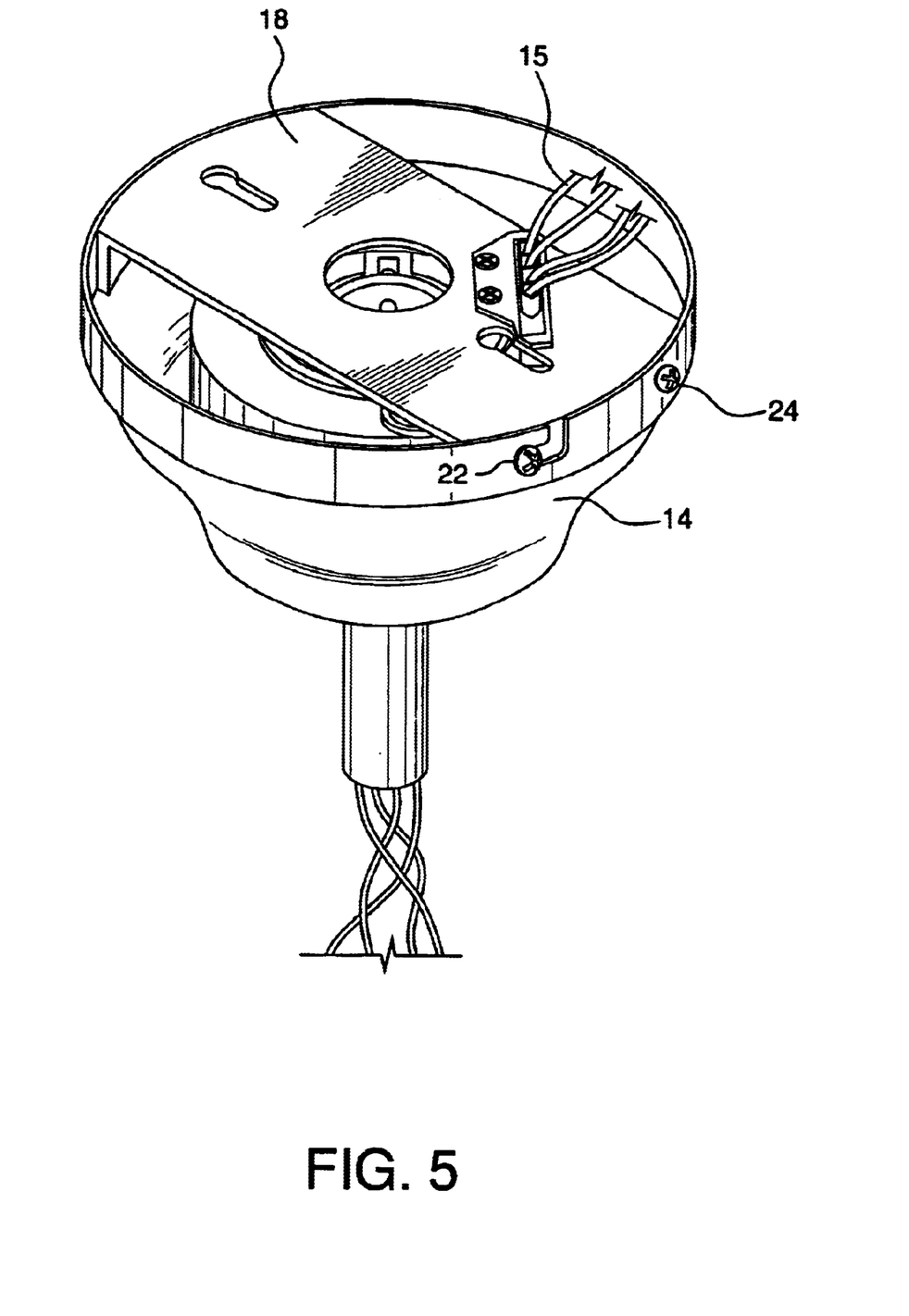
FIG. 5 is a perspective view of the quick connect device mounted within a bell.
Figure 6:
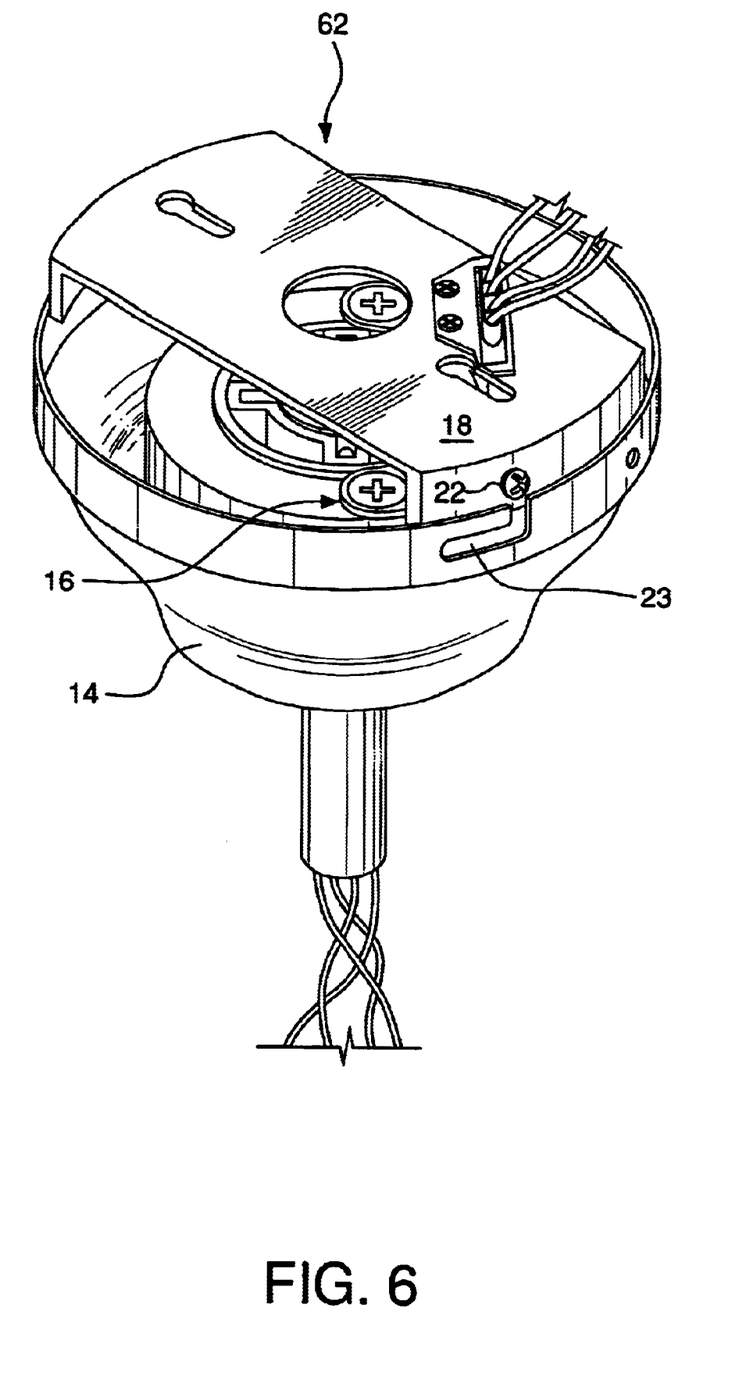
FIG. 6 is perspective view of the quick connect device shown partially disengaged from the bell.

A preferred embodiment of the invention is shown in FIGS. 1–7. The plug plate 18 guides or screws 22 mounted on its opposite ends align with the alignment channel 23 on the bell (FIG. 6). The plug plate 18 is mounted to the electrical box 10 (as shown in FIGS. 1–3) using plug plate screws 25 which extend through plug plate slot 27. The plug plate holes can fit a variety of sizes of electrical boxes. For overhead lighting and fans, the electrical box 10 is mounted above the ceiling.

Figure 7:
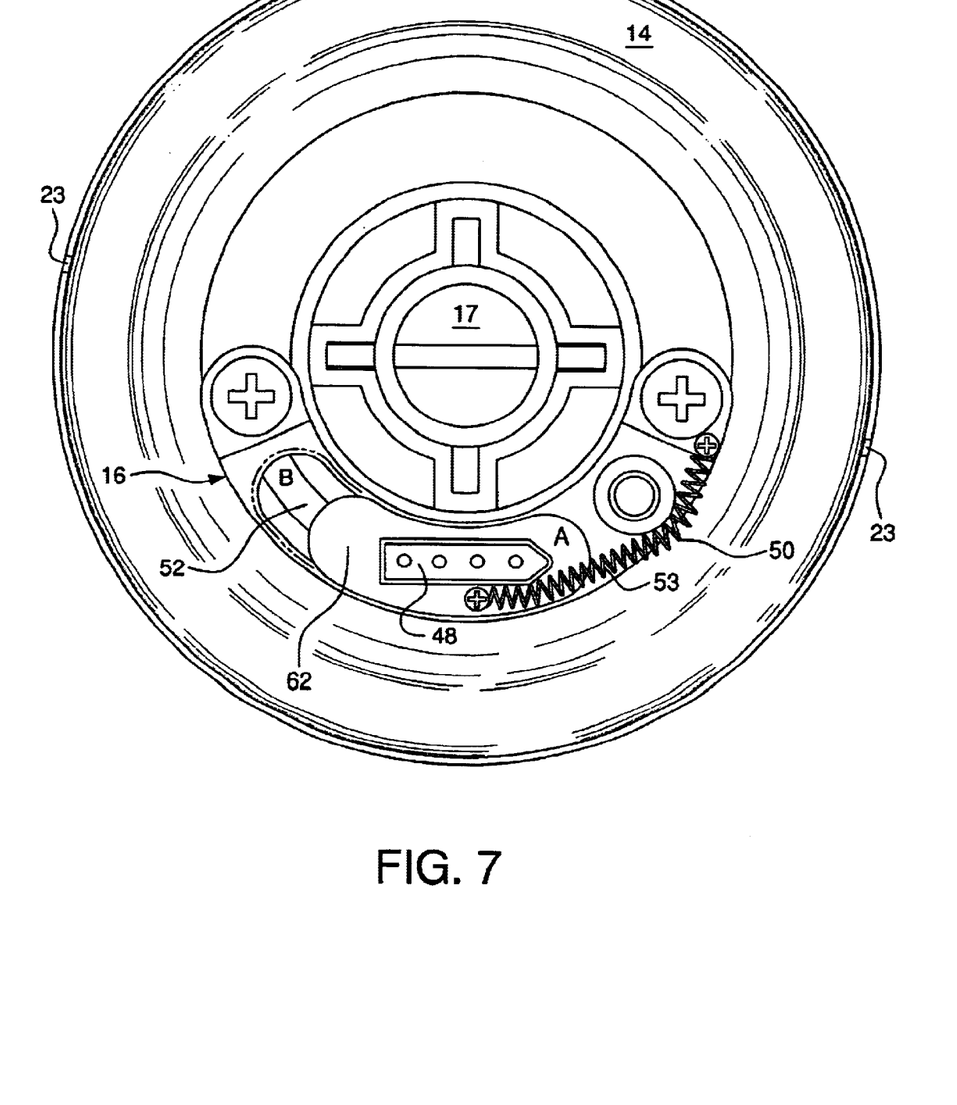
FIG. 7 is a top view of the receptacle and the bell with the receptacle in the slidable alignment position.

FIG. 7 shows the receptacle assembly 16 mounted within the bell 14. When the bell 14 is properly aligned, as shown in FIG. 6, the screws 22 are pushed into alignment channel 23, and the plug 44 engages receptacle 48. The bell 14 rotates around the matingly engaged plug 44 and receptacle 48. During rotation, from a point on the bell 14, the receptacle 48 slides from its slidable alignment position A to its slidable support position B along the receptacle channel 52. Before the plug and receptacle are engaged, a tension spring 50 maintains the position of the receptacle 48 so that the receptacle 48 aligns with the plug 44 during installation. FIG. 7 shows the receptacle in the slidable alignment position A; the slidable support position B is shown with dashed lines.

The plug and receptacle are properly aligned by positioning the screws 22 and the alignment channel 23. The channel has two connected paths for the screw 22 to travel: 1) an alignment path 33, and 2) a support path 34. FIG. 7 shows the receptacle 48 in dashed lines as it would be positioned once the screws 22 have traveled to the end of the support path 34. The screw 22 enters the alignment path (FIG. 1) 33 and stops when it reaches the right angle shown. As it travels the alignment path 33, the plug 44 matingly engages the receptacle 48. As the screw 22 then travels along the support path 34, the screw 22 assumes the load of the bell 14 and lighting fixture.

In FIG. 5, the electrical wires 15 that pass through back of the plug plate 18 and connect with the plug 44 originate outside the electrical box 10. Wires (not shown) run from the receptacle 48 down shaft 6 (FIG. 7) to the electrical fixture.

Figure 8:
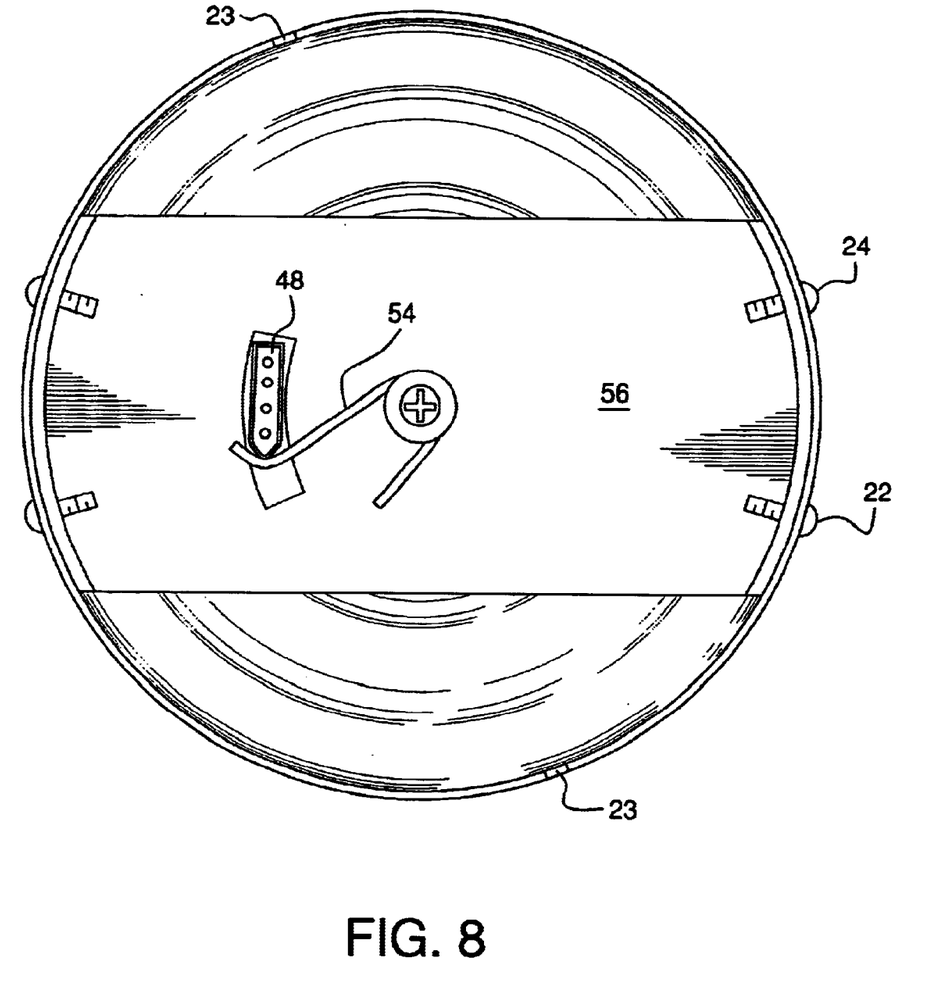
FIG. 8 is a top view of the receptacle assembly of an alternate embodiment mounted within a bell.

An alternate embodiment is shown in FIG. 8. The primary difference in this embodiment is that the spring is shown as a leaf spring 54, rather than the tension spring 50 shown in the preferred embodiment. Also, the receptacle assembly 56 shown spans only a portion of the bell 14. The receptacle assembly 16 is mounted within the bell, and the plug is wired to the electrical fixture below the receptacle assembly.

A variation of both embodiments wherein the plug mounted on the receptacle assembly and the receptacle is attached to the plug plate would be obvious in view of the foregoing descriptions.

A further embodiment of the quick connect device has the alignment and support channels found within the plug plate and the guides mounted to the interior of the bell. The positioning and securing of the bell and plug plate for this embodiment is similar to that already described. Alignment of the guides and alignment channel would mate the plug and the receptacle. As the guide on the bell traveled to a terminal point in the support channel, the weight of the bell transfers to the screws.

INSTALLATION OF THE PREFERRED EMBODIMENT

The installer raises the fan bell 14 above his head and aligns the screws 22 with the alignment path 33 on the bell 14. Next, he pushes the screw 22 into the alignment path 33 and rotates the bell so that the screws 22 follow the support path 34. Once the screws 22 reach the terminal point of the support path 34, the bell is secured to the plug plate 18 by tightening the alignment screw 22 and the mounting screw 24 (which extends through hole 26 in the bell into hole 29 on the plug plate). Finally, the electrical fixture is attached to the bell.

Reference Number List:
- 10—electrical box
- 14—bell
- 15—electrical wires
- 16—receptacle assembly
- 17—shaft
- 18—plug plate
- 22—guides or screws
- 23—channel
- 24—mounting screw
- 25—plug plate screws
- 26—hole in bell
- 27—plug plate slot
- 29—hole in plug plate
- 33—alignment path
- 34—support path
- 44—plug
- 48—receptacle
- 50—tension spring
- 52—receptacle channel
- 54—leaf spring
- 56—alternate embodiment of receptacle assembly
- A—slidable alignment position
- B—slidable support position The present invention may be embodied in still further specific forms without departing from the spirit or essential attributes thereof.

I claim:

1. A quick connect assembly for mounting electrical fixtures comprising:

a) a plug plate, the plug plate having a plug mounted thereon, the plug plate having an alignment guide for supporting the weight of the electrical fixture;

b) a receptacle assembly mounted within a bell, the receptacle assembly including a receptacle that matingly engages the plug to form an electrically conductive connection, the receptacle being slidably mounted within the receptacle assembly, the receptacle comprising a slidable alignment position and a slidable support position;

c) a bell attached to the electrical fixture and having a channel for receiving the alignment guide, the channel comprising an alignment path and a support path, the guide engaging the channel in the alignment path and the support path, the channel support path capable of supporting the weight of the bell and electrical fixture;

d) wherein the plug and the receptacle are matingly engaged in the slidable alignment position when the guide is aligned in the alignment path within the channel; and e) wherein the plug and receptacle are matingly engaged in the slidable support position when the alignment guide is in the support path within the channel.

2. The quick connect assembly of claim 1 further comprising a spring, said spring having a first connection to the receptacle and a second connection to the receptacle assembly, the spring opposes force exerted on the receptacle that acts to move the receptacle from the slidable alignment position to the slidable support position.

3. The quick connect assembly of claim 1 wherein the plug plate is attached to an electrical box.

4. The quick connect assembly of claim 1 wherein the bell is mounted substantially flush to a ceiling when the guide is in the channel's support path.

5. The quick connect assembly of claim 1 wherein the bell is removably locked in the support position by a screw passing through the bell and into the plug plate.

6. The quick connect assembly of claim 1 wherein a the plug is contained within a protective skirt that matingly engages the outer periphery of the receptacle.

7. The quick connect assembly of claim 1 wherein a the receptacle is contained within a protective skirt that matingly engages the outer periphery of the plug.

8. The quick connect assembly of claim 1 wherein the guide is a screw.

9. The quick connect assembly of claim 2 wherein the spring is a tension spring.

10. The quick connect assembly of claim 2 wherein the spring is a leaf spring.

11. A quick connect assembly for mounting electrical fixtures comprising:
   a) a receptacle plate having a receptacle mounted thereon, the receptacle plate having an alignment guide for supporting the weight of the electrical fixture;
   b) a plug assembly within a bell, the plug assembly including a plug that matingly engages the receptacle to form an electrically conductive connection, the plug being slidably mounted within the plug assembly, the plug comprising a slidable alignment position and a slidable support position;
   c) a bell attached to the electrical fixture and having a channel for receiving the alignment guide, the channel comprising an alignment path and a support path, the guide engaging the channel in the alignment path and the support path, the channel support path capable of supporting the weight of the bell and electrical fixture;
   d) wherein the plug and the receptacle are matingly engaged in the slidable alignment position when the guide is aligned in the alignment path within the channel; and
   e) wherein the plug and receptacle are matingly engaged in the slidable support position when the alignment guide is in the support position within the channel.

12. The quick connect assembly of claim 9 further comprising a spring, said spring having a first connection to the plug and a second connection to the plug assembly, the spring opposes force exerted on the plug that acts to move the plug from the slidable alignment position to the slidable support position.

13. The quick connect assembly of claim 9 wherein the receptacle plate is attached to an electrical box.

14. The quick connect assembly of claim 9 wherein the bell is mounted substantially flush to a ceiling when the guide is in the channel's support path.

15. The quick connect assembly of claim 9 wherein the bell is removably locked in the support position by a screw passing through the bell and into the receptacle plate.

16. The quick connect assembly of claim 9 wherein a the plug is contained within a protective skirt that matingly engages the outer periphery of the receptacle.

17. The quick connect assembly of claim 9 wherein a the receptacle is contained within a protective skirt that matingly engages the outer periphery of the plug.

18. The quick connect assembly of claim 1 wherein the guide is a screw.

19. The quick connect assembly of claim 12 wherein the spring is a tension spring.

20. The quick connect assembly of claim 12 wherein the spring is a leaf spring.

* * * * *